United States Patent [19]

Katsuno et al.

[11] 4,426,102
[45] Jan. 17, 1984

[54] AUTOMATICALLY FASTENING SEATBELT SYSTEM

[75] Inventors: Mitsuaki Katsuno; Shigeru Moriya, both of Toyota, Japan

[73] Assignee: Toyota Jidosha Kogyo Kabushiki Kaisha, Aichi, Japan

[21] Appl. No.: 325,926

[22] Filed: Nov. 30, 1981

[30] Foreign Application Priority Data

Dec. 1, 1980 [JP] Japan .................. 55-172374[U]

[51] Int. Cl.³ ............................................ B60R 21/10
[52] U.S. Cl. .................................. 280/804; 280/802; 280/803
[58] Field of Search ...................... 280/804, 802, 803; 297/469

[56] References Cited

U.S. PATENT DOCUMENTS

| | | | |
|---|---|---|---|
| 4,213,637 | 7/1980 | Mauron | 280/804 |
| 4,258,933 | 3/1981 | Takada | 280/804 |
| 4,284,294 | 8/1981 | Takada | 280/803 |
| 4,286,804 | 9/1981 | Malkawa | 280/803 |

*Primary Examiner*—Robert R. Song
*Attorney, Agent, or Firm*—Parkhurst & Oliff

[57] ABSTRACT

The present invention relates to an automatically fastening seatbelt system wherein webbings for restraining an occupant are automatically fastened about the occupant upon his entering the vehicle, to thereby improve the safety of the occupant. This seatbelt system is of an arrangement that, when the occupant enters or leaves the vehicle, an webbing is positioned forward in looking from the vehicle to prevent the webbing to slide on the lap of the occupant and the like, so that the actions of the occupant entering or leaving the vehicle can be facilitated. This seatbelt system can drive a guide arm for moving the intermediate portion of the webbing and a sprocket wheel for moving an anchor of the webbing by use of a single motor.

3 Claims, 7 Drawing Figures

FIG. I

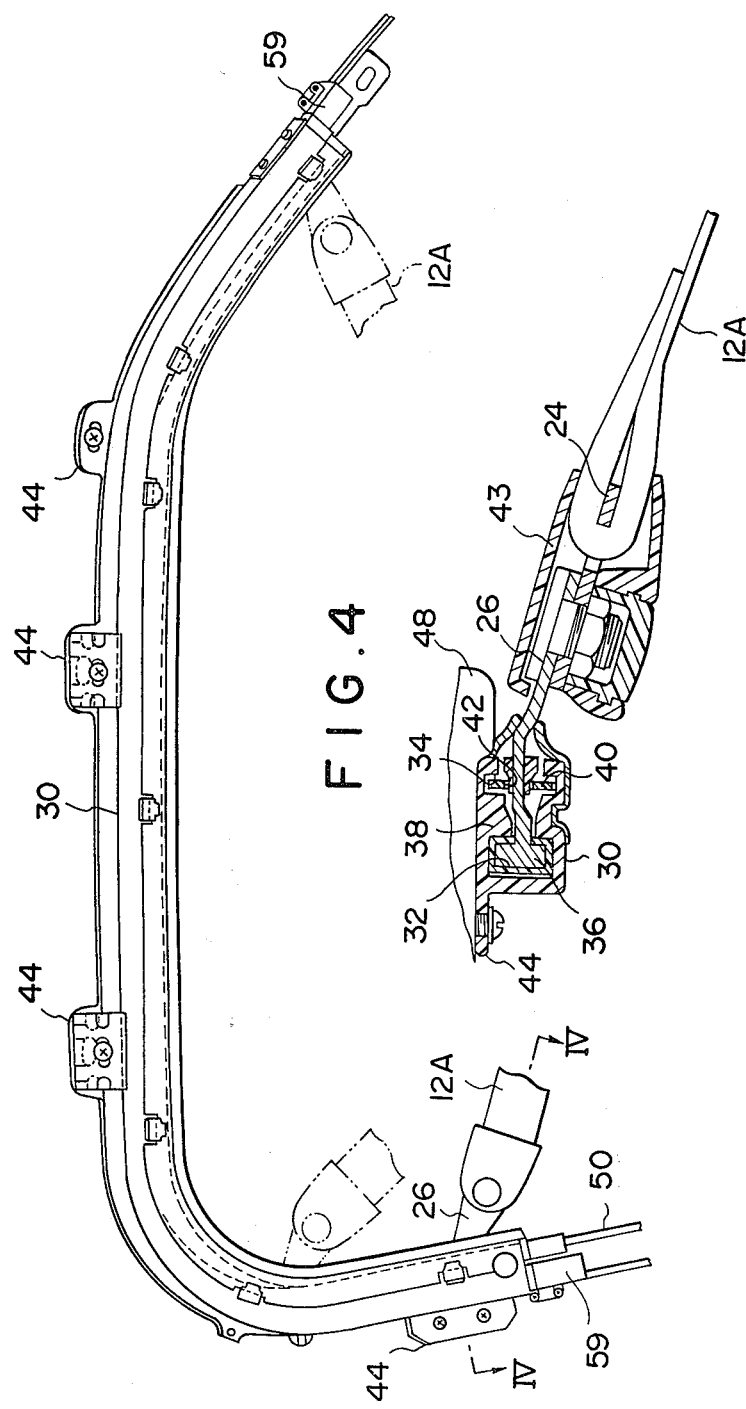

AUTOMATICALLY FASTENING SEATBELT SYSTEM

BACKGROUND OF THE INVENTION

1. Field of the Invention

This invention relates to an automatically fastening seatbelt system wherein webbings for restraining an occupant is automatically fastened about the occupant upon his entering a vehicle, thereby improving the safety of the occupant in the event of an emergency situation of the vehicle.

2. Description of the Prior Art

There has been proposed a so-called automatically fastening seatbelt system wherein a portion of one of the occupant restraining webbings is driven in the longitudinal direction of a vehicle by a driving force of a motor upon his entering the vehicle so as to automatically fasten the webbings about him. In the automatically fastening seatbelt system of the type described, if a portion of a lap webbing is flexed forward in looking from the vehicle when the occupant enters or leaves the vehicle, then the lap of the occupant can avoid sliding on the lap webbing, so that it becomes possible for the occupant to comfortably enter or leave the vehicle.

In the automatically fastening seatbelt system described above, and in order to move the lap webbing, it becomes necessary to provide an additional motor for driving the lap webbing in the longitudinal direction of the vehicle; also a motor is needed for driving the occupant restraining webbings as a whole, thus requiring four motors for a driver and an assistant driver. As a consequence, without mentioning the resulting cost increase, an increased weight of the vehicle is caused by the motors.

SUMMARY OF THE INVENTION

The present invention has been developed to obviate the disadvantages of the prior art and has as its object the provision of an automatically fastening seatbelt system wherein two portions of a shoulder webbing and a lap webbing are driven by a single motor, enabling to facilitate the actions of the occupant entering and leaving the vehicle. The automatically fastening seatbelt system is constructed such that a driving force of a motor is imparted to either one of a sprocket wheel for driving a guide arm or an anchor of a webbing for moving the intermediate portion of the webbing, and a rotational force of the motor is imparted as a rotational force of a rotary shaft to the other, i.e., the sprocket wheels or the anchor of the webbing, whereby two portions of the shoulder webbing and the lap webbing are driven.

BRIEF DESCRIPTION OF THE DRAWINGS

FIG. 3 is a front view showing the guide rail;

FIG. 4 is a sectional view taken along the line IV—IV in FIG. 3;

DETAILED DESCRIPTION OF THE INVENTION

Description will be given of the embodiment of the present invention with reference to the drawings.

Figure 1:
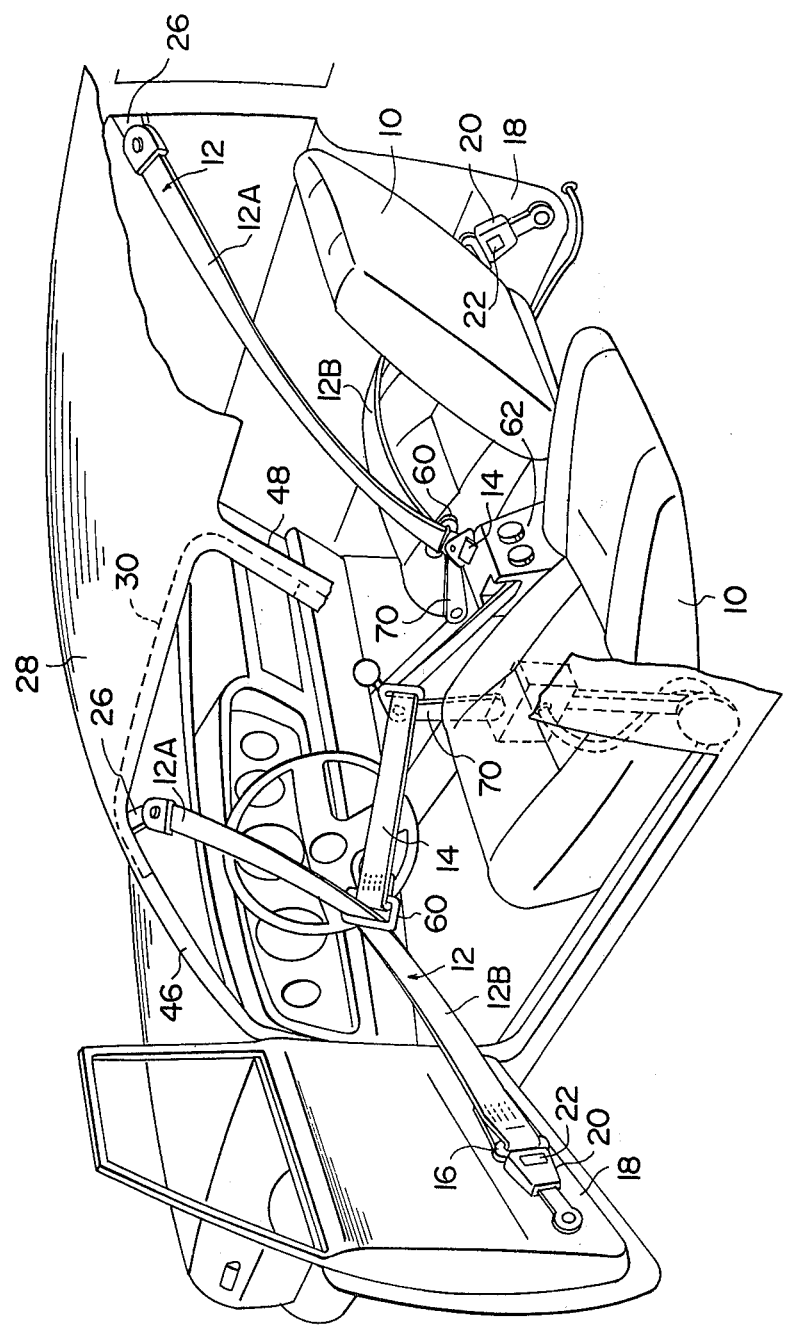
FIG. 1 is a perspective view showing an embodiment of the automatically fastening seatbelt system according to the present invention.
Figure 2:
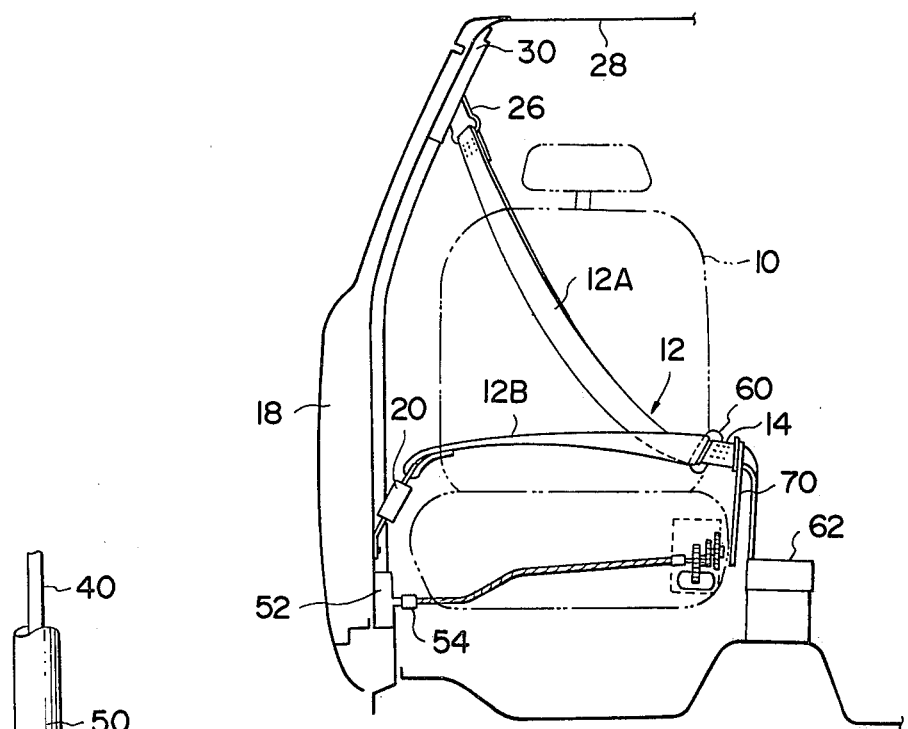
FIG. 2 is a side view showing the driver's seat in FIG. 1 in looking from the rear of the vehicle.

As shown in FIG. 1, an occupant seated at a seat 10 is adapted to be fastened thereabout with an outer webbing 12 and an inner webbing 14.

One end of the outer webbing 12 is engaged with a buckle device solidly secured to the lower rear portion of a door 18 through a tongue plate 16. This buckle device 20 is provided with a release button 22, with which the occupant can release the engagement of the tongue plate 16 in the event of an emergency situation of the vehicle.

On the other hand, the other end portion of the outer webbing 12 is engaged with a shoulder anchor 26 through a connecting ring 24 as shown in FIGS. 3 and 4. This shoulder anchor 26 is adapted to be guided along a guide rail 30 laid on a roof-side of the vehicle body in the longitudinal direction of the vehicle.

Figure 5:
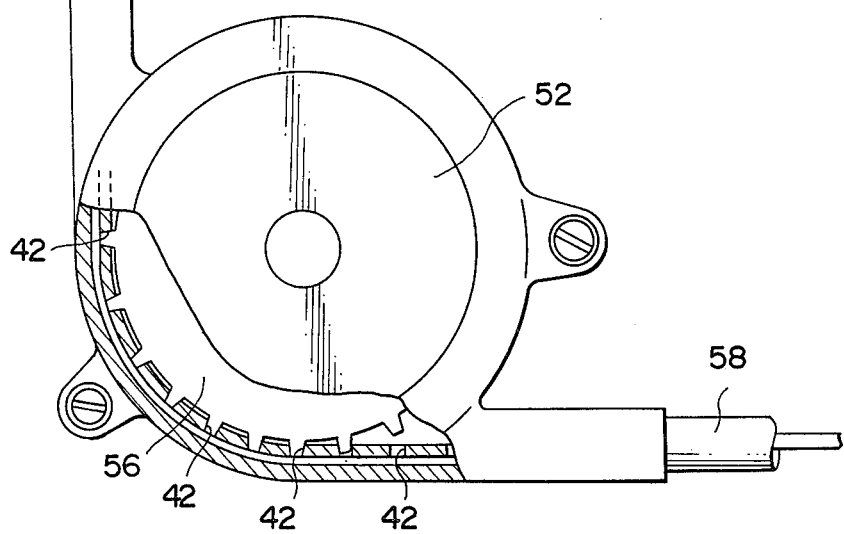
FIG. 5 is a front view showing the sprocket housing.
Figure 6:
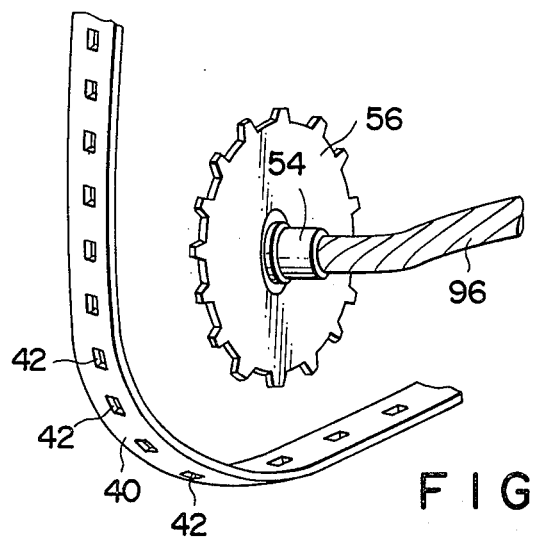
FIG. 6 is a disassembled perspective view showing the state of engagement of the sprocket wheel with the flexible tape.

This guide rail 30 is provided therein with an anchor groove 32 and a slide groove 34 in a section perpendicular to the longitudinal direction thereof as shown in FIG. 4. An enlarged head portion 36 of the shoulder anchor 26 is received in the anchor groove 32 and movable in the longitudinal direction thereof. In the event of an emergency situation of the vehicle, neck portions 38 between the anchor groove 32 and the slide groove 34 prevent the shoulder anchor 26 from falling off the guide rail 30, to impart the tensile force of the outer webbing 12 to the roof-side 28. Furthermore, as shown in FIGS. 5 and 6, a flexible tape 40 is received in the slide groove 34 and movable in the longitudinal direction of the guide rail 30. A multiplicity of holes 42 are penetrated in this flexible tape 40 at suitable intervals in the longitudinal direction thereof, and the intermediate portion of the shoulder anchor 26 penetrates through one of the holes 42. Consequently, when the flexible tape 40 moves in the longitudinal direction of the guide rail 30, the shoulder anchor 26 moves in the longitudinal direction of the guide rail 30 to thereby fasten the shoulder webbing about the occupant. In addition, the shoulder anchor 26 and the connecting ring 24 are covered by a dust cover 43.

The guide rail 30 is solidly secured at the intermediate portion to the roof-side 28 by means of a bracket 44 and disposed in the longitudinal direction of the vehicle. The forward end portion of the guide rail 30 in looking from the vehicle descends along a front pillar 46 of the vehicle body, and the rear end portion thereof is suspended along the center pillar 48. The rear end portion of the guide rail 30 is connected thereto with a track 50 and communicated with the slide groove 34. The other end portion of the track 50 is communicated with a sprocket housing 52 secured solidly to the lower portion of the center pillar 48 as shown in FIG. 5. The flexible tape 40 passes through the track 50 and is led to the sprocket housing 52, where it is meshed with a sprocket wheel 56 secured solidly to a shaft 54. Additionally, the sprocket housing 52 is further communicated with an auxiliary track 58 and guides the flexible tape 40, which has been meshed with the sprocket wheel 56. The guide rail 30 is provided at the forward and rear ends with limit switches 59 for controlling the stroke of the shoulder anchor 26.

On the other hand, the intermediate portion of the aforesaid outer webbing 12 passes through a ring 60. This ring 60 is engaged with the forward end portion of the inner webbing 14, and the base portion of the inner webbing 14 is wound into a retractor 62 provided substantially at the center of the vehicle. This retractor 62 winds thereinto the inner webbing 14 by an urging force, however, incorporating therein is an inertia lock mechanism for abruptly stopping the unwinding of the inner webbing 14 in the event of an emergency situation of the vehicle.

As shown in the assistant driver'seat in FIG. 1, when the door is closed, substantially the total length of the inner webbing 14 is adapted to be wound into the retractor 62, and consequently, a portion of the outer webbing 12 between the ring 60 and the shoulder anchor 26 is fastened about the occupant as shoulder webbing 12A and a portion of the outer webbing 12 between the ring 60 and the buckle device 20 is also fastened about the occupant as a lap webbing 12B, respectively.

Figure 7:
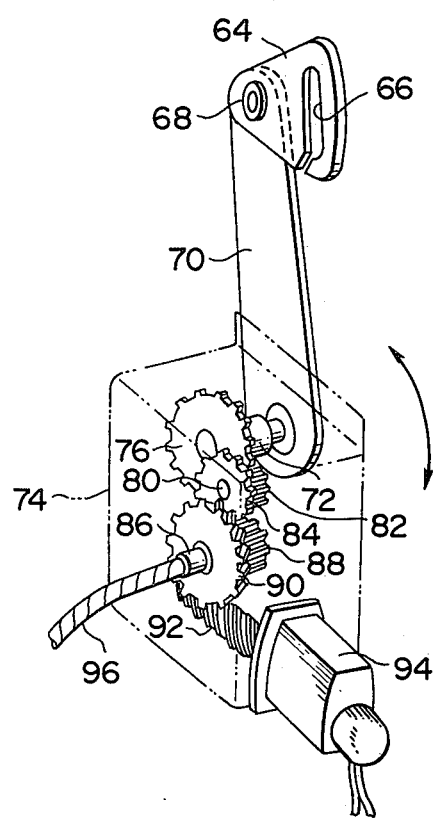
FIG. 7 is a perspective view showing the state of connection between the guide arm and the motor.

The intermediate portion of this inner webbing 14 is inserted through a guide ring 64. As shown in FIG. 7, this guide ring 64 formed with a C-shaped cut-away portion 66 for allowing the inner webbing 14 to pass through, and rotatably supported on the forward end portion of a guide arm 70 through a shaft 68. Solidly secured to a rotary shaft portion of this guide arm 70 is a center shaft 72, which is rotatably supported on a gear box 74 affixed to the seat 10.

In the gear box 74, solidly secured to the center shaft 72 is a large spur gear 76, which is meshed with a small spur gear 82 of an intermediate shaft 80 rotatably supported on the gear box 74. Further, solidly secured to this intermediate shaft 80 is a large spur gear 84, which is meshed with a small spur gear 88 of an input shaft 86 rotatably supported on the gear box 74. Affixed to the input shaft 86 is a worm wheel 90, which is meshed with a worm 92. This worm 92 is connected to an output shaft of a motor 94.

Accordingly, the motor 94 is adapted to impart its rotational force to the center shaft 72 of the guide arm 70 through a gear train including a plurality of gears. For example, when the occupant closes the door, the motor 94 rotates the guide arm 70 through a predetermined angle rearward in looking from the vehicle (Refer to the assistant driver's seat in FIG. 1), and, when the occupant opens the door, the motor 94 rotates the guide arm 70 through a predetermined angle forward in looking from the vehicle (Refer to the driver's seat in FIG. 1).

Affixed to the input shaft 86, to which an output of the motor 94 is deceleratedly transmitted, is one end of a wire 96, which is a flexible rotary shaft. This wire 96 imparts a rotational force of the input shaft 86 as a rotational force about the axis, being flexible. As shown in FIG. 6, the forward end of this wire 96 is connected to the shaft of the sprocket wheel 56.

Consequently, the motor 94 is adapted to rotate the sprocket wheel 56 in unison with the guide arm 70. When the guide arm 70 is rotated rearward in looking from the vehicle, i.e., the occupant closes the door, the wire 96 rotates the shoulder anchor 26 rearward in looking from the vehicle through the flexible tape 40, and, when, reversely, the guide arm 70 is rotated forward in looking from the vehicle, the wire 96 rotates the shoulder anchor 26 forward in looking from the vehicle.

Description will now be given of action of this embodiment with the above described arrangement. FIG. 1 shows the state where the door is opened for allowing the occupant to enter the vehicle. Here, the shoulder anchor 26 has moved to a position close to the forward end portion of the vehicle, and the guide arm 70 has rotated forward in looking from the vehicle, whereby a space for the occupant to enter the vehicle is formed between the seat 10 and the outer and inner webbings 12 and 14.

Consequently, it is possible for the occupant to readily enter the vehicle. When the occupant closes the door 18 upon his entering the vehicle, the motor 94 imparts its driving force to the guide arm 70 to rotate the guide arm 70 rearward in looking from the vehicle, and simultaneously, rotates the shoulder anchor 26 along the guide rail 30 rearward in looking from the vehicle, through the wire 96.

By this, as shown in the assistant driver's seat in FIG. 1, the remaining portion of the inner webbing 14 is wound into the retractor 62, and the opposite end portions of the outer webbing 12 are automatically fastened about the shoulder and lap of the occupant through the ring 60.

During normal running condition of the vehicle, the inner webbing 14 can be unwound from the retractor 62, so that the occupant can desirably change his driving posture. When the occupant moves the seat in the longitudinal direction of the vehicle, the wire 96, having flexibility, can be flexed in accordance with the position of the seat 10, so that the rotational force of the motor 94 can be constantly transmitted to the sprocket wheel 56.

When the vehicle has been fallen into the event of an emergency situation such as a collision, the inertia lock mechanism, not shown, in the retractor 62 suddenly stop the unwinding of the inner webbing 14, so that the occupant is reliably restrained by the shoulder webbing 12A and the lap webbing 12B, thus enabling to secure the safety of the occupant. When the occupant escapes from the vehicle to outside upon completion of the collision, if he presses the release button 22 of the buckle device 20, then the outer webbing 12 is released from the door 18, whereby he can unfasten the webbing and open the door 18 to escape from the vehicle to outside.

When the occupant leaves the vehicle upon completion of the normal running condition of the vehicle, if he opens the door 18, then the motor 94 rotates in the reverse direction, whereby the shoulder anchor 26 rotates along the guide rail 30 forward in looking from the vehicle, and the guide arm 70 rotates about the center shaft 72 forward in looking from the vehicle, so that the state of the driver's seat shown in FIG. 1 can be brought about. By this, the occupant can readily leave the vehicle.

In particular, in the conditions of the automatically webbing fastening and unfastening conditions, since the guide arm 70 rotates about the center shaft 72 forward in looking from the vehicle, the intermediate portion of the inner webbing 14 is elevated, and simultaneously, flexed forward in looking from the vehicle. Therefore, when the inner webbing 14 is unwound in accordance with the opening of the door, it does not slide on the lap of the occupant, so that no comfortable feeling is given to the occupant.

As has been described hereinabove, in the automatically fastening seatbelt system according to the present invention, a driving force of a motor is imparted to either one of a sprocket wheel for driving a guide arm or an anchor of a webbing for moving the intermediate portion of the webbing, and a rotational force of the motor is imparted as a rotational force of a rotary shaft to the other, so that the present invention can offer such an outstanding advantage that the webbing anchor and the intermediate portion of the webbing are simultaneously driven by a single motor, whereby the occupant can be brought into an automatical and comfortable seatbelt fastened state.

What is claimed is:

1. An automatically fastening seatbelt system comprising:

an outer webbing;

an inner webbing one end of which slidably engages an intermediate portion of the said outer webbing, the other end of which is connected to a retractor secured at the central portion of a vehicle floor;

a guide rail laid on a roof-side of a vehicle body for guiding a webbing anchor supporting said outer webbing in the longitudinal direction of the vehicle;

a perforated flexible tape guided by said guide rail and connected at one end thereof to said webbing anchor;

a sprocket wheel meshed with a portion of said flexible tape for driving said flexible tape along said guide rail;

a guide arm slidably engaging at the forward end thereof an intermediate portion of the inner webbing;

a gear train connected to a center shaft of said guide arm;

a motor for driving either one of said sprocket wheel or said gear train; and a rotary shaft for connecting said sprocket wheel to said gear train so as to transmit a rotational force from one side to the other.

2. An automatically fastening seatbelt system as set forth in claim 1, wherein said rotary shaft for connecting said sprocket to said gear train is formed of a flexible wire.

3. An automatically fastening seatbelt system as set forth in claim 1, wherein said webbing anchor is solidly secured to one end portion of said outer webbing, and said guide arm detachably holds the intermediate portion of said inner webbing.

* * * * *